Jan. 11, 1944.　　　　　F. N. LARSON　　　　　2,338,725
VALVE STARTING SHOCK WHEEL
Filed Nov. 24, 1942

Frederick Nelson Larson.
INVENTOR

BY
ATTORNEY

Patented Jan. 11, 1944

2,338,725

UNITED STATES PATENT OFFICE 2,338,725

VALVE STARTING SHOCK WHEEL

Frederick Nelson Larson, United States Navy

Application November 24, 1942, Serial No. 466,824

5 Claims. (Cl. 137—139)

(Granted under the act of March 3, 1883, as amended April 30, 1928; 370 O. G. 757)

This invention relates to a valve starting shock wheel and has for an object to provide an improved shock means for starting a valve, particularly a valve which is stuck in either an open or closed position, and hence which is difficult to actuate.

A further object of this invention is to provide a means intended to be left permanently attached to the stem of a valve which is ordinarily difficult to operate, thus making it easy to initiate opening or closing movement of the valve.

A further object of this invention is to provide a means to be permanently attached to the valve stem and make it easy to open or close the valve without the use of any temporarily attached wrench or lever. Many times valves are placed in locations that are difficult of access as well as in locations where it is impossible to temporarily attach a sufficiently long lever to exert any substantial amount of force thereon, but with this invention valves in such difficult locations can be easily opened or closed without the necessity of any temporarily attached long levers thereon.

A further object of this invention is to provide a valve opening and closing means which may be made in several forms according to the particular needs of the valve to which it is to be attached.

With the foregoing and other objects in view, the invention consists in the construction, combination and arrangement of parts hereinafter described and illustrated in the drawing, in which.

Figure 1:
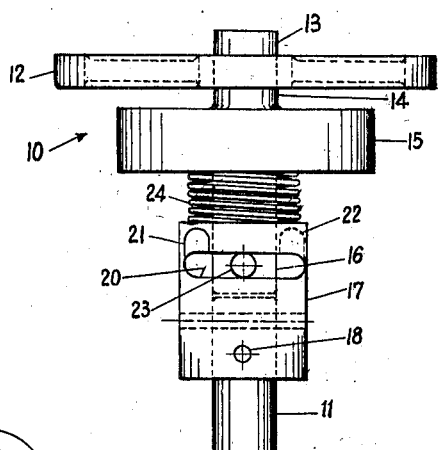
Fig. 1 is an elevational view of the preferred form of the valve starting shock wheel of this invention.

There is shown at 10 the valve starting shock wheel of this invention for initiating rotation of the valve stem 11 attached to a valve (not shown). This valve starting shock wheel includes a handle wheel 12 on the top end 13 of a shaft 14. Mounted on this shaft 14 is a flywheel 15 while the lower end 16 of the shaft 14 extends into one end of a sleeve 17, the other end of the sleeve 17 being secured as by a pin 18 to the valve stem 11. The sleeve 17 is provided with a slot 20 which, as shown, extends about 110° circumferentially thereabout and which may be provided at each end thereof, if desired, with short longitudinal slots 21 and 22 connected thereto.

The heavy boss or pin 23 is secured to the flywheel shaft 14 and extends into the slot 20 of sleeve 17, the size of the pin 23 being such that it may move radially within the length of the slot 20 and longitudinally into either slot 21 or 22, a spring 24 being provided between the flywheel 15 and the sleeve 17 to move the pin 23 into either slot 21 or 22 when the shaft 14 is at such an angle that gravity will not move it into the longitudinal slot if desired.

In operation, the valve stem 11 may be rotated in an appropriate direction to open the valve by placing the slot 21 or 22 of sleeve 17 over the pin 23 and manually manipulating the wheel 12. Should the valve be stuck or too difficult to move in this manner, the wheel 12 may be lifted or moved to raise the pin 23 out of slot 21 or 22 and into the slot 20. Then the periphery of handle wheel 12 is grasped and rotated as rapidly as desired, causing the rotation of the shaft 14 and the flywheel 15. The pin 23 will then travel at a rapidly increasing rate until it reaches the opposite end of its slot 20 and deliver a hammer blow against the end of the slot in the sleeve 17 which is thus transmitted through the pin 18 and the valve stem 11 to initiate the starting movement of the valve. When the pin 23 is in either longitudinal slot, the wheel 12 will directly control the rotation of the valve stem 11.

Figure 2:
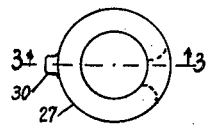
Fig. 2 is a top plan view of a modified form of sleeve for connecting the flywheel to the valve stem.
Figure 3:
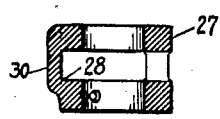
Fig. 3 is a sectional view on line 3—3 of Fig. 2.
Figure 4:
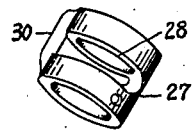
Fig. 4 is a projected view of Fig. 3.

In Figs. 2, 3 and 4 a different type of sleeve 27 is shown which may be substituted for the sleeve 17. In the sleeve 27 the slot 28 is shown as extending about 280° about sleeve 27, a strengthening rib 30 being shown clear of the path of travel of the shaft pin through the slot 28. The slot 28, as shown in sleeve 27, may extend as much as 280° about the circumference thereof, thus permitting the flywheel to gain more speed.

Figure 5:
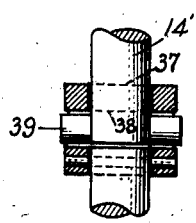
Fig. 5 is a sectional view of another form of sleeve.
Figure 6:
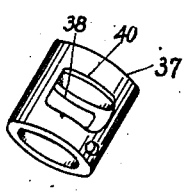
Fig. 6 is a projected view of Fig. 5.

In the modified form of sleeve shown at 37 in Figs. 5 and 6, two oppositely disposed slots 38 and 40 are shown, each slot being approximately 110°. In this case, a double ended pin 39 would extend through the flywheel shaft 14' with one end in each of the slots 38 and 40, and thus be adapted to strike simultaneously against the ends of the slots in the sleeve 37. With this double slot in the sleeve 37 a flywheel of heavier weight can be provided, due to this extra strength in the sleeve 37, but obviously the flywheel could not rotate as far as with the form of sleeve shown at 27.

Other modifications and changes in the number and proportions of the parts may be made by those skilled in the art without departing from the nature of this invention within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A valve stem starting shock wheel means comprising a valve stem, a shaft, a sleeve attached to said valve stem, said shaft extending into said sleeve, a circumferential slot in said sleeve, a boss on said shaft extending into said slot, and a flywheel mounted on said shaft whereby said flywheel may be rotated to rotate said shaft and cause said boss thereon to strike a hammer blow against the end of the slot in said sleeve to initiate rotation of the valve stem.

2. A valve stem starting shock wheel means comprising a valve stem, a shaft, a sleeve attached to said valve stem, said shaft extending into said sleeve, a circumferential slot in said sleeve, a boss on said shaft extending into said slot, a flywheel mounted on said shaft whereby said flywheel may be rotated to rotate said shaft and cause said boss thereon to strike a hammer blow against the end of the slot in said sleeve to initiate rotation of the valve stem, and a handle wheel mounted on the flywheel shaft.

3. A valve stem starting shock wheel means comprising a valve stem, a shaft, a sleeve attached to said valve stem, said shaft extending into said sleeve, a circumferential slot in said sleeve, a boss on said shaft extending into said slot, a flywheel mounted on said shaft whereby said flywheel may be rotated to rotate said shaft and cause said boss thereon to strike a hammer blow against the end of the slot in said sleeve to initiate rotation of the valve stem, and a handle wheel mounted on the flywheel shaft, said handle wheel being of greater diameter than said flyweel to provide greater leverage in rotation of said flywheel.

4. A valve stem starting shock wheel means comprising a valve stem, a shaft, a sleeve attached to said valve stem, said shaft extending into said sleeve, a circumferential slot in said sleeve, said slot extending substantially more than halfway about said sleeve, a boss on said shaft extending into said slot, a reinforcing rib secured to the outer wall of said sleeve on both sides of said slot out of the path of said boss, and a flywheel mounted on said shaft whereby said flywheel may be rotated to rotate said shaft and cause said boss thereon to strike a hammer blow against the end of the slot in said sleeve to initiate rotation of the valve stem.

5. A valve stem starting shock wheel means comprising a valve stem, a shaft, a sleeve attached to said valve stem, said shaft extending into said sleeve, circumferential slot means in said sleeve, boss means on said shaft extending into said slots, and a flywheel mounted on said shaft whereby said flywheel may be rotated to rotate said shaft and cause said boss means thereon to strike hammer blows against the ends of the slots in said sleeve to initiate rotation of the valve stem.

FREDERICK NELSON LARSON.